US012614465B2

(12) United States Patent
Zhang et al.

(10) Patent No.: US 12,614,465 B2
(45) Date of Patent: Apr. 28, 2026

(54) FLIGHT PATH DETERMINATION

(71) Applicant: Beijing Sankuai Online Technology Co., Ltd., Beijing (CN)

(72) Inventors: Bangyan Zhang, Beijing (CN); Pei An, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 613 days.

(21) Appl. No.: 17/919,747

(22) PCT Filed: Apr. 22, 2021

(86) PCT No.: PCT/CN2021/088917
§ 371 (c)(1),
(2) Date: Oct. 19, 2022

(87) PCT Pub. No.: WO2021/218762
PCT Pub. Date: Nov. 4, 2021

(65) Prior Publication Data

US 2025/0111787 A1 Apr. 3, 2025

(30) Foreign Application Priority Data

Apr. 26, 2020 (CN) ......................... 202010340054.8
Apr. 26, 2020 (CN) ......................... 202010340087.2

(51) Int. Cl.
*G08G 5/32* (2025.01)
*G08G 5/55* (2025.01)
(Continued)

(52) U.S. Cl.
CPC ................. *G08G 5/32* (2025.01); *G08G 5/55* (2025.01); *G08G 5/59* (2025.01); *G08G 5/80* (2025.01)

(58) Field of Classification Search
CPC .. G08G 5/32; G08G 5/55; G08G 5/59; G08G 5/80
See application file for complete search history.

(56) References Cited

U.S. PATENT DOCUMENTS 10,102,755 B1 10/2018 Hamilton et al.
2007/0043481 A1* 2/2007 Metschan ................ G08G 5/32 701/120

(Continued)

FOREIGN PATENT DOCUMENTS

CN 102625198 A 8/2012
CN 104391907 A 3/2015

(Continued)

OTHER PUBLICATIONS

Math is Fun, "Sequences and Series," 2007. (Year: 2007).*

(Continued)

*Primary Examiner* — Stephanie T Su
(74) *Attorney, Agent, or Firm* — Kilpatrick Townsend & Stockton LLP

(57) ABSTRACT

A flight path determining method is provided. In some embodiments, the method includes determining, according to a flight origin and destination of an aircraft and a topological graph corresponding to blocks in a target space, a block path that the aircraft passes through from the flight origin to the flight destination from the blocks, where flight origin and destination are in the target space, there are spatial points with position information in the target space, and each block includes a spatial point group obtained by grouping the spatial points; determining entrance and exit information of each block in block path according to position information of each spatial point and block path; and determining a flight path of aircraft according to position information of each spatial point, position information of flight origin and (Continued)

destination, connections between spatial points, block path, and entrance and exit information of each block in block path.

17 Claims, 4 Drawing Sheets

(51) Int. Cl.
*G08G 5/59* (2025.01)
*G08G 5/80* (2025.01)

(56) References Cited

U.S. PATENT DOCUMENTS

| | | | | |
|---|---|---|---|---|
| 2009/0299619 | A1* | 12/2009 | Dean | G08G 5/55 701/532 |
| 2010/0094485 | A1 | 4/2010 | Verlut et al. | |
| 2012/0191333 | A1* | 7/2012 | Sawhill | G08G 5/53 701/122 |
| 2016/0210863 | A1 | 7/2016 | Kohn-Rich | |
| 2016/0358480 | A1 | 12/2016 | Kang et al. | |
| 2017/0199041 | A1 | 7/2017 | Itabashi et al. | |
| 2017/0213465 | A1 | 7/2017 | Parekh et al. | |
| 2018/0267524 | A1 | 9/2018 | Chen et al. | |
| 2018/0308371 | A1 | 10/2018 | Cao et al. | |
| 2020/0118450 | A1 | 4/2020 | Gariel et al. | |
| 2020/0166895 | A1* | 5/2020 | Ferreira | G06F 16/28 |
| 2021/0312819 | A1* | 10/2021 | Ayhan | G08G 5/55 |

FOREIGN PATENT DOCUMENTS

| | | | |
|---|---|---|---|
| CN | 105758410 | A | 7/2016 |
| CN | 106382933 | A | 2/2017 |
| CN | 106679666 | A | 5/2017 |
| CN | 106950995 | A | 7/2017 |
| CN | 107656545 | A | 2/2018 |
| CN | 107918396 | A | 4/2018 |
| CN | 108351652 | A | 7/2018 |
| CN | 108594858 | A | 9/2018 |
| CN | 108981739 | A | 12/2018 |
| CN | 109410651 | A | 3/2019 |
| CN | 109634304 | A | 4/2019 |
| CN | 109933089 | A | 6/2019 |
| CN | 110045732 | A | 7/2019 |
| CN | 110084393 | A | 8/2019 |
| CN | 110262548 | A | 9/2019 |
| CN | 110420461 | A | 11/2019 |
| CN | 111024092 | A | 4/2020 |
| CN | 112382135 | A | 2/2021 |
| JP | 2017001661 | A | 1/2017 |
| JP | 2019028712 | A | 2/2019 |
| JP | 2019038479 | A | 3/2019 |
| JP | 2020004200 | A | 1/2020 |
| WO | 2019077006 | A1 | 4/2019 |

OTHER PUBLICATIONS

State Intellectual Property Office of the People's Republic of China, Office Action and Search Report Issued in Application No. 2020103400548, Apr. 6, 2021, 22 pages.(Submitted with Machine/ Partial Translation).
State Intellectual Property Office of the People's Republic of China, Office Action and Search Report Issued in Application No. 2020103400872, Apr. 12, 2021, 15 pages. (Submitted with Machine/ Partial Translation).
ISA State Intellectual Property Office of the People's Republic of China, International Search Report Issued in Application No. PCT/ CN2021/088917, Jul. 14, 2021, WIPO, 4 pages.
ISA State Intellectual Property Office of the People's Republic of China, Written Opinion of the International Searching Authority Issued in Application No. PCT/CN2021/088917, Jul. 14, 2021, WIPO, 7 pages.(Submitted with Machine/ Partial Translation).
Hu Qing-wu et al "On-line Path Search Algorithm Based on Spatial Block Path Cache"Computer Engineering vol. 36 No. 22 Nov. 30, 2010, 3 pages.
Sikang Liu et al"Search-based Motion Planning for Quadrotors using Linear Quadratic Minimum Time Control""arXiv:1709. 05401v1 [cs.RO] Sep. 15, 2017" Sep. 15, 2017, 8 pages.
Japanese Patent Office, Office Action Issued in Application No. 2022-564776, Jul. 4, 2023, 8 pages. (Submitted with Machine Translation).
European Patent Office, Extended European Search Report Issued in Application No. 21797382.5, Aug. 24, 2023, Germany, 7 pages.

* cited by examiner

FLIGHT PATH DETERMINATION

CROSS REFERENCE TO RELATED APPLICATION

This application is a US National Phase of a PCT Application No. PCT/CN2021/088917, filed on Apr. 22, 2021, which claims a priority of the Chinese patent application No. 202010340054.8 filed on Apr. 26, 2020, and a priority of Chinese patent application No. 202010340087.2 filed on Apr. 26, 2020, all of which are incorporated herein by reference in their entireties.

TECHNICAL FIELD

The present disclosure relates to the field of artificial intelligence, and particularly to flight path determination.

BACKGROUND

With the development of sciences and technologies, aircrafts have been applied more and more frequently in all walks of life. For an aircraft, such as an unmanned aerial vehicle and an aircraft supporting autonomous piloting, it is necessary to plan a flight path in advance before use. According to regulatory requirements, an aircraft needs to fly in the sky according to certain rules, rather than randomly generates a flight path. Based on business needs and complex urban geographical environments (such as more building obstacles and frequent traveling of a large number of aircrafts in the same space), there are made higher requirements for flight path planning of aircrafts.

SUMMARY

A main objective of the present disclosure is to provide a flight path determining method and apparatus, a storage medium, and an electronic device.

A first aspect of the present disclosure provides a flight path determining method, including: determining, according to position information of a flight origin of a target aircraft, position information of a flight destination of the target aircraft, and a topological graph corresponding to a plurality of blocks in a target space, a block path from the plurality of blocks, where the block path is configured to represent a plurality of first blocks that the target aircraft passes through from the flight origin to the flight destination, both the flight origin and the flight destination are in the target space, there are a plurality of spatial points with first connection information in the target space, the first connection information is configured to represent whether every two spatial points in the target space are in connection, and the block includes a spatial point group determined by grouping the plurality of spatial points; determining entrance and exit information corresponding to each of the plurality of first blocks according to position information of each spatial point, the first connection information, and the block path, where the entrance and exit information includes an entrance spatial point of the target aircraft into the first block, and/or an exit spatial point of the target aircraft out the first block; and determining a flight path of the target aircraft from the flight origin to the flight destination according to the block path and the entrance and exit information corresponding to each first block.

In some embodiments, the method further includes: grouping the plurality of spatial points according to the first connection information and fitness information and position information of each spatial point to determine the plurality of blocks, where the fitness information of the spatial point is configured to represent a frequency that the aircraft passes through the spatial point within a preset time period; and determining second connection information corresponding to the plurality of blocks according to the first connection information to generate the topological graph, where the second connection information is configured to represent whether every two blocks of the plurality of blocks are in connection.

In some embodiments, the grouping the plurality of spatial points according to the first connection information and fitness information and position information of each spatial point to determine the plurality of blocks includes: performing a gridding process on the target space to divide the target space into a plurality of geometric regions; determining a fitness region where each spatial point is located according to the fitness information of each spatial point; and grouping spatial points in a same geometric region and a same fitness region and in mutual connection into the same spatial point group as the block.

In some embodiments, the fitness region includes a dense region and a sparse region, and the determining a fitness region where each spatial point is located according to the fitness information of each spatial point includes: determining, in a case that the frequency that the aircraft passes through the spatial point within the preset time period is greater than a preset frequency, that the spatial point is in the dense region; or, determining, in a case that the frequency that the aircraft passes through the spatial point within the preset time period is less than or equal to the preset frequency, that the spatial point is in the sparse region.

In some embodiments, the determining the second connection information corresponding to the plurality of blocks according to the first connection information to generate the topological graph includes: determining, in a case that a second spatial point in a second block is in connection with a third spatial point in a third block, that the second block is in connection with the third block to obtain the second connection information, where the second block and the third block are any two of the plurality of blocks, the second spatial point is any spatial point in the second block, and the third spatial point is any spatial point in the third block; and generating the topological graph according to the second connection information.

In some embodiments, the block path is further configured to represent a connection sequence of the plurality of first blocks, and the determining, according to position information of a flight origin of a target aircraft, position information of a flight destination, and a topological graph corresponding to a plurality of blocks in a target space, a block path from the plurality of blocks includes: determining an origin block corresponding to the flight origin and a destination block corresponding to the flight destination from the plurality of blocks according to the position information of the flight origin and the position information of the flight destination; and determining the plurality of first blocks and the connection sequence through a preset path finding algorithm according to the origin block, the destination block, and the topological graph, where the plurality of first blocks include the origin block and the destination block.

In some embodiments, the determining entrance and exit information corresponding to each first block according to position information of each spatial point and the block path includes: determining a fourth spatial point closest to first block i+1 in the block path among a plurality of spatial points in first block i in the block path as the exit spatial point of first block i; determining a connection path between an exit spatial point of first block i−1 in the block path and a fifth spatial point in first block i according to the first connection information, where the fifth spatial point is a spatial point closest to the exit spatial point of the first block i−1 among the plurality of spatial points in first block i; and determining a spatial point first found from first block i during path finding for the connection path as an entrance spatial point of first block i, where i is an integer greater than or equal to 1, and a distance between a spatial point and the first block is a distance between the spatial point and a preset position in the first block.

In some embodiments, the determining the flight path of the target aircraft from the flight origin to the flight destination according to the block path and the entrance and exit information corresponding to each first block includes: determining a straight path between an entrance spatial point and an exit spatial point of each first block according to the entrance and exit information corresponding to each first block; detecting a collision risk on each straight path to determine a first flight sub-path in each first block; determining a second flight sub-path between the flight origin and the entrance spatial point of the first block corresponding to the flight origin in the block path and a third flight sub-path between the exit spatial point of the first block corresponding to the flight destination in the block path and the flight destination according to the position information of each spatial point, the position information of the flight origin, the position information of the flight destination, the block path, and the entrance and exit information corresponding to each first block; and connecting the second flight sub-path, respective first flight sub-paths, and the third flight sub-path in sequence to generate the flight path.

In some embodiments, the detecting the collision risk on each straight path to determine the first flight sub-path in each first block includes: determining the straight path as the first flight sub-path in a case that there is no collision risk on the straight path; or, determining the first flight sub-path through a preset path planning algorithm according to connections of spatial points in the first block in a case that there is the collision risk on the straight path.

A second aspect of the present disclosure provides a flight path determining apparatus, including: a block path determining module, configured to determine, according to position information of a flight origin of a target aircraft, position information of a flight destination, and a topological graph corresponding to a plurality of blocks in a target space, a block path from the plurality of blocks, where the block path is configured to represent a plurality of first blocks that the target aircraft passes through from the flight origin to the flight destination, both the flight origin and the flight destination are in the target space, there are a plurality of spatial points with first connection information in the target space, the first connection information is configured to represent whether every two spatial points in the target space are in connection, and the block includes a spatial point group determined by grouping the plurality of spatial points; an information determining module, configured to determine entrance and exit information corresponding to each first block of the plurality of first blocks according to position information of each spatial point, the first connection information, and the block path, where the entrance and exit information includes an entrance spatial point of the target aircraft into the first block, and/or an exit spatial point of the target aircraft out the first block; and a flight path determining module, configured to determine a flight path of the target aircraft from the flight origin to the flight destination according to the block path and the entrance and exit information corresponding to each first block.

In some embodiments, the apparatus further includes: a block obtaining module, configured to group the plurality of spatial points according to the first connection information and fitness information and position information of each spatial point to determine the plurality of blocks, where the fitness information of the spatial point is configured to represent a frequency that the aircraft passes through the spatial point within a preset time period; and a topological graph generating module, configured to determine second connection information corresponding to the plurality of blocks according to the first connection information to generate the topological graph, where the second connection information is configured to represent whether every two blocks of the plurality of blocks are in connection.

In some embodiments, the block obtaining module is configured to perform a gridding process on the target space to divide the target space into a plurality of geometric regions, determine a fitness region where each spatial point is located according to the fitness information of each spatial point, and group the spatial points in a same geometric region and a same fitness region and in mutual connection into the same spatial point group as the block.

In some embodiments, the fitness region includes a dense region and a sparse region, and the block obtaining module is configured to determine, in a case that the frequency that the aircraft passes through the spatial point within the preset time period is greater than a preset frequency, that the spatial point is in the dense region, or, determine, in a case that the frequency that the aircraft passes through the spatial point within the preset time period is less than or equal to the preset frequency, that the spatial point is in the sparse region.

In some embodiments, the topological graph generating module, configured to: determine, in a case that a second spatial point in a second block is in connection with a third spatial point in a third block, that the second block is in connection with the third block to obtain the second connection information, where the second block and the third block are any two of the plurality of blocks, the second spatial point is any spatial point in the second block, and the third spatial point is any spatial point in the third block; and generate the topological graph according to the second connection information.

In some embodiments, the block path is further configured to represent a connection sequence of the plurality of first blocks, and the block path determining module is configured to determine an origin block corresponding to the flight origin and a destination block corresponding to the flight destination from the plurality of blocks according to the position information of the flight origin and the position information of the flight destination, and determine the plurality of first blocks and the connection sequence through a preset path finding algorithm according to the origin block, the destination block, and the topological graph, where the plurality of first blocks include the origin block and the destination block.

In some embodiments, the information determining module is configured to: determine a fourth spatial point closest to first block i+1 in the block path among a plurality of spatial points in first block i in the block path as the exit spatial point of first block i; determine a connection path between an exit spatial point of first block i−1 in the block path and a fifth spatial point in first block i according to the first connection information, where the fifth spatial point is a spatial point closest to the exit spatial point of first block i−1 among the plurality of spatial points in first block i; and determine a spatial point first found from first block i during path finding for the connection path as an entrance spatial point of first block i, where i is an integer greater than or equal to 1, and a distance between a spatial point and the first block is a distance between the spatial point and a preset position in the first block.

In some embodiments, the flight path determining module is configured to determine a straight path between an entrance spatial point and an exit spatial point of each first block according to the entrance and exit information corresponding to each first block, detect a collision risk on each straight path to determine a first flight sub-path in each first block, determine a second flight sub-path between the flight origin and the entrance spatial point of the first block corresponding to the flight origin in the block path and a third flight sub-path between the exit spatial point of the first block corresponding to the flight destination in the block path and the flight destination according to the position information of each spatial point, the position information of the flight origin, the position information of the flight destination, the block path, and the entrance and exit information corresponding to each first block, and connect the second flight sub-path, respective first flight sub-paths, and the third flight sub-path in sequence to generate the flight path.

In some embodiments, the flight path determining module is configured to determine the straight path as the first flight sub-path in a case that there is no collision risk on the straight path, or, determine the first flight sub-path through a preset path planning algorithm according to connections of spatial points in the first block in a case that there is the collision risk on the straight path.

A third aspect of the present disclosure provides a computer readable storage medium having a computer program stored thereon, when the computer program is executed by a processor, causing the processor to implement steps of the method of determining a flight path of the first aspect.

A fourth aspect of the present disclosure provides an electronic device, including: A memory having a computer program stored thereon. A processor for executing the computer program in the memory to implement steps of the method of determining a flight path of the first aspect.

The technical solutions provided in the present disclosure may at least have the following technical effects. An upper-level path including blocks is determined in the target space including the flight origin and the flight destination, and then paths in each block involved in the upper-level path are detailed, so that calculation for flight path finding may be reduced effectively, and the flight path planning efficiency may further be improved.

Additional features and advantages of the disclosure will be set forth in the detailed description which follows.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure and not to limit the disclosure. In the drawings.

DETAILED DESCRIPTION OF THE EMBODIMENTS

Reference will now be made in detail to the embodiments of the present disclosure, examples of which are illustrated in the accompanying drawings. It should be understood that the specific embodiments described herein are illustrative and explanatory only and are not restrictive of the disclosure.

In the related art, there are two technical directions for path planning methods for aircrafts, including a scatter-based path planning method and a search-based path planning method. The scatter-based path planning method is mainly represented by a rapidly-exploring random tree-based method. The method is characterized by searching a high-dimensional space and guiding searching to a blank region through random sampling points of a state space, so as to find a planned path from a starting point to a target point. The search-based path planning method is represented by the Dijkstra algorithm and the A-Star algorithm (referred to as A* algorithm for short). According to the A* algorithm, graph nodes are traversed, and path consumptions and heuristically estimated cost values of the graph nodes are calculated to find a shortest path from an origin to a destination in a graph. However, both the scatter-based path planning method and the search-based path planning method involve a traversal searching process of original nodes in the space. As a result, these path finding methods involve a large amount of calculation during execution, and are applicable to a scenario of a relatively small map or a relatively simple surrounding environment. For an application scenario of a relatively large area or a relatively complex surrounding environment, these methods need too much time for path finding, which results in relatively low path planning efficiency.

In view of this problem, a flight path determining method is provided.

Figure 1:
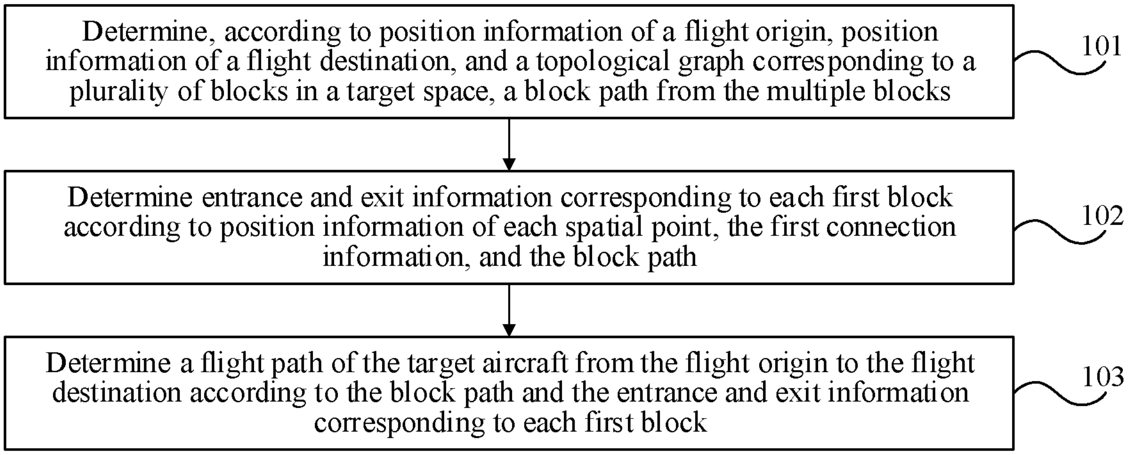
FIG. 1 is a flowchart of a flight path determining method according to an exemplary embodiment.

FIG. 1 is a flowchart of a flight path determining method according to an exemplary embodiment. As shown in FIG. 1, the method includes steps 101, 102, and 103.

At step 101: according to position information of a flight origin of a target aircraft, position information of a flight destination of the target aircraft, and a topological graph corresponding to a plurality of blocks in a target space, a block path is determined from the plurality of blocks, where the block path is configured to represent a plurality of first blocks the target aircraft passes through from the flight origin to the flight destination, as well as a connection sequence of the plurality of first blocks, the flight origin and the flight destination are in the target space, there are a plurality of spatial points in the target space, the plurality of spatial points have first connection information, each of which has position information, each block includes a spatial point group obtained by grouping the plurality of spatial points, the topological graph is configured to represent connections between the plurality of blocks, and the first connection information is configured to represent whether every two of the plurality of spatial points are in connection.

Exemplarily, the target aircraft may be an aircraft such as an unmanned aerial vehicle or an aircraft supporting autonomous piloting. The flight origin and the flight destination are input by a user of the target aircraft in advance. The target space is a three-dimensional space. The position information of the flight origin, the position information of the flight destination, and position information of all the spatial points involved below are all three-dimensional coordinates. After the position information of the flight origin and the position information of the flight destination are received, the target space may be determined according to an actual environment of the flight origin and the flight destination. The target space has actually been divided into a plurality of spatial points in or not in mutual connection according to a geographical environment in a region, flight-related restriction information, and historical flight records. That is, these spatial points may represent geographical and regular environments required by flight path planning in the target space. In practice, there may be numerous spatial points in a target space. However, in this embodiment, spatial points other than the above spatial points are regarded as being absent during flight path determining.

Exemplarily, before step 101, a target space is determined first according to a flight origin and a flight destination, and a plurality of spatial points in the target space and first connection information of the plurality of spatial points are obtained. Then, the plurality of spatial points are grouped to obtain a plurality of spatial point groups or blocks, and a topological graph of all the blocks is determined. Afterwards, a block path is determined block the plurality of blocks in step 101. The process of grouping these spatial points is actually dividing the plurality of spatial points in the target space into the plurality of spatial point groups according to a preset grouping rule. The spatial points in each spatial point group occupy a regular or irregular space in the target space, and the space is the block. The spatial points in each spatial point group or block are stored in a tree structure based on a requirement of the following related steps for path finding. For example, the tree structure may be a k-dimensional tree (referred to as a k-d tree for short) or any ordered tree suitable for storing three-dimensional or two-dimensional spatial points. Therefore, the target space has been divided into a plurality of blocks before step 101, each of which corresponds to a tree structure for representing positions and connections of the spatial points in this block. The connections between the plurality of spatial points in the target space, once determined, may not be changed by grouping of these spatial points. Moreover, the connections between the spatial points are used in subsequent steps for determining connections between the blocks to further generate a topological graph and for performing path finding in first blocks.

Exemplarily, the idea of divide-and-conquer may be used in step 101 to find an upper-level block path first at the level of the whole target space and then perform path exploration in a subsequent step in each first block in the upper-level block path. Specifically, a path including blocks is found first according to the connections between the blocks, i.e., the block path. When the position information of the flight origin and the flight destination and the topological graph corresponding to the plurality of blocks are known, the blocks corresponding to the flight origin and the flight destination may be determined according to the position information of the flight origin and the flight destination, and then a preset path finding algorithm is performed based on the topological graph to find a path including blocks, i.e., the block path, from the topological graph. The path finding algorithm may be a heuristic search algorithm, such as the A* algorithm, an ordered search algorithm (referred to as an A algorithm for short), or the Dijkstra algorithm.

At step 102: entrance and exit information corresponding to each first block is determined according to position information of each spatial point, the first connection information, and the block path.

Exemplarily, if the flight origin is in a certain block (i.e., an origin block of the block path), there is no entrance spatial point in the origin block. Similarly, if the flight destination is in a certain block (i.e., a destination block of the block path), there is no exit spatial point in the destination block. A first block including no flight origin and flight destination has both an entrance spatial point and an exit spatial point. Therefore, the entrance and exit information includes an entrance spatial point of the target aircraft into the first block and/or an exit spatial point of the target aircraft out the first block.

Exemplarily, it is necessary to determine a connection between a macroscopic level and a microscopic level after the block path is macroscopically determined and before microscopic path exploration is performed in each first block. The entrance and exit information is used for reflecting the connection between the macroscopic level and the microscopic level. The connection between the first blocks in the block path is a conceptual relationship incapable of reflecting an actual line that may be determined as a flight path. In practice, actual paths connecting the first blocks may further be determined according to the positions and connections of the spatial points. In addition, in the process of determining entrance and exit information of a certain first block, spatial points outside the first block may be involved in some cases. Therefore, position information of each spatial point and the first connection information of the plurality of spatial points are required in addition to the block path.

At step 103: a flight path of the target aircraft from the flight origin to the flight destination is determined according to the block path and the entrance and exit information corresponding to each first block.

Exemplarily, after the entrance spatial point and exit spatial point of each first block are determined in step 102, the entrance spatial point and exit spatial point of the same first block may be directly connected in step 103 to determine a flight sub-path. Alternatively, if the entrance spatial point and exit spatial point of the same first block may not be directly connected for some reason, a flight sub-path may be found from the first block taking the entrance spatial point and the exit spatial point as a search origin and destination through the foregoing heuristic search algorithm according to a topological relationship shown by the tree structure of the plurality of spatial points in each first block. After the flight sub-path in each first block is determined, these flight sub-paths may be connected in sequence according to the connection sequence of the plurality of first blocks in the block path, so as to plan a flight path from the flight origin to the flight destination for the target aircraft.

According to the technical solution provided in this embodiment, an upper-level path including blocks is determined in the target space including the flight origin and the flight destination, and then paths in each block involved in the upper-level path are detailed, so that calculation for flight path finding may be reduced effectively, and the flight path planning efficiency may further be improved.

Figure 2:
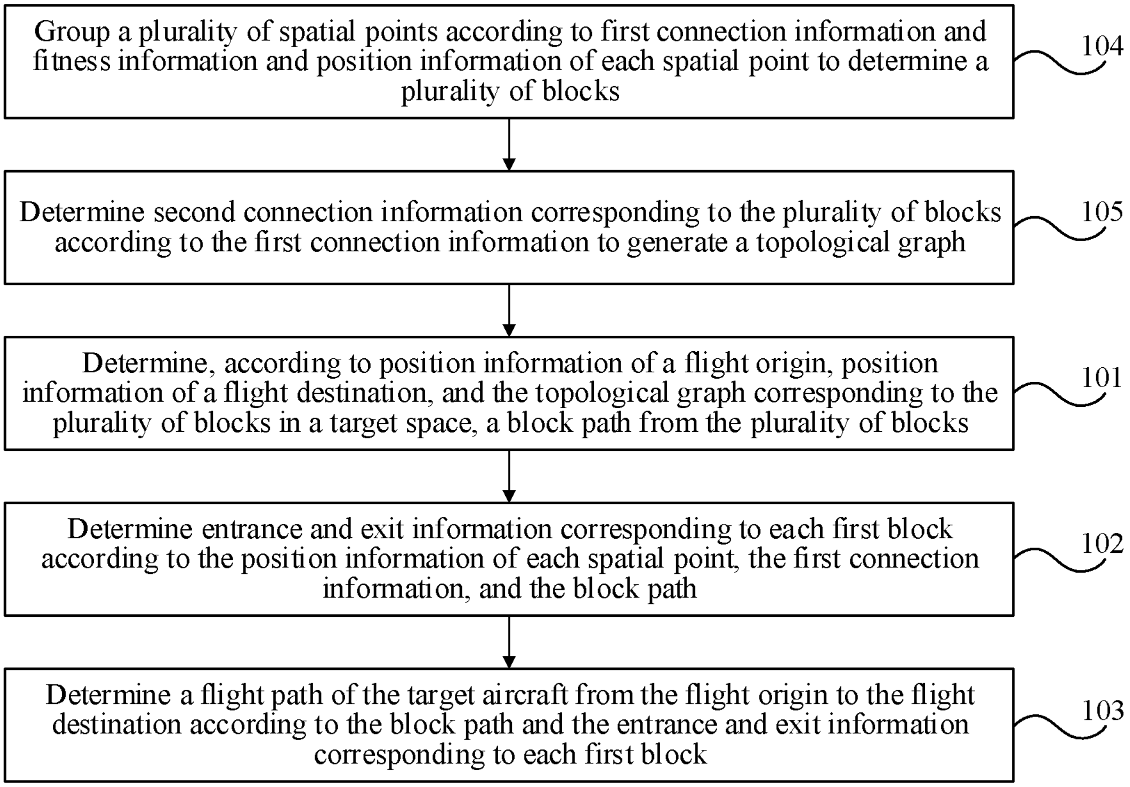
FIG. 2 is a flowchart of a flight path determining method according to another exemplary embodiment.

FIG. 2 is a flowchart of a flight path determining method according to another exemplary embodiment. As shown in FIG. 2, each spatial point also has fitness information for representing a frequency that the aircraft passes through the spatial point within a preset time period. Before step 101 in the method shown in FIG. 1, the method may further include steps 104 and 105.

At step 104: the plurality of spatial points are grouped according to the first connection information and fitness information and position information of each spatial point to determine the plurality of blocks, where the fitness information of the spatial point is configured to represent a frequency that the aircraft passes through the spatial point within a preset time period.

Exemplarily, grouping of these spatial points in the target space needs to follow a certain grouping rule. For example, the grouping rule may be a rule determined by combining geometric regions obtained by performing a gridding process on the target space and fitness regions determined based on fitness. The geometric regions may be a plurality of cubes, cuboids, etc., of the same volume determined by performing the gridding process on the target space. The fitness region determined based on the fitness is equivalent to analyzing whether the spatial points are suitable for the aircraft to fly through and further performing binary classification on all the spatial points in the target space according to an analysis result. Specifically, in an embodiment, whether the spatial point is suitable for the aircraft to fly through may be analyzed according to the frequency in the fitness information. If there are often aircrafts flying through a spatial point, the spatial point is regarded as being suitable for the aircraft to fly through. If aircrafts rarely pass through a spatial point, the spatial point is regarded as being unsuitable for the aircraft to pass through. Therefore, the spatial points aircrafts often pass through are divided into a class, and the spatial points aircrafts rarely pass through are divided into a class. For example, some spatial points in military zones or private domains where aircrafts are not allowed to pass through are spatial points where aircrafts rarely fly.

At step 105: second connection information corresponding to the plurality of blocks is determined according to the first connection information to generate the topological graph, where the second connection information is configured to represent whether every two of the plurality of blocks are in connection. It can be understood that the first connection information represents the connections between the spatial points through which an actual flight path may be generated, while the second connection information herein represent conceptual connections between the blocks.

Exemplarily, all the connections between the blocks in the topological graph are conceptual connections, and these connections are determined based on the actual connections between the spatial points in the blocks. For example, if spatial point a in block A is in connection with spatial point b in block B, there is a conceptual connection between block A and block B; and if all spatial points in block C are not in connection with all spatial points in block D, there is no conceptual connection between block C and block D. Therefore, step 105 may further include: determining, in a case that a second spatial point in a second block is in connection with a third spatial point in a third block, that the second block is in connection with the third block to obtain the second connection information, where the second block and the third block are any two of the plurality of blocks, the second spatial point is any spatial point in the second block, and the third spatial point is any spatial point in the third block; and generating the topological graph according to the second connection information.

Figure 3:
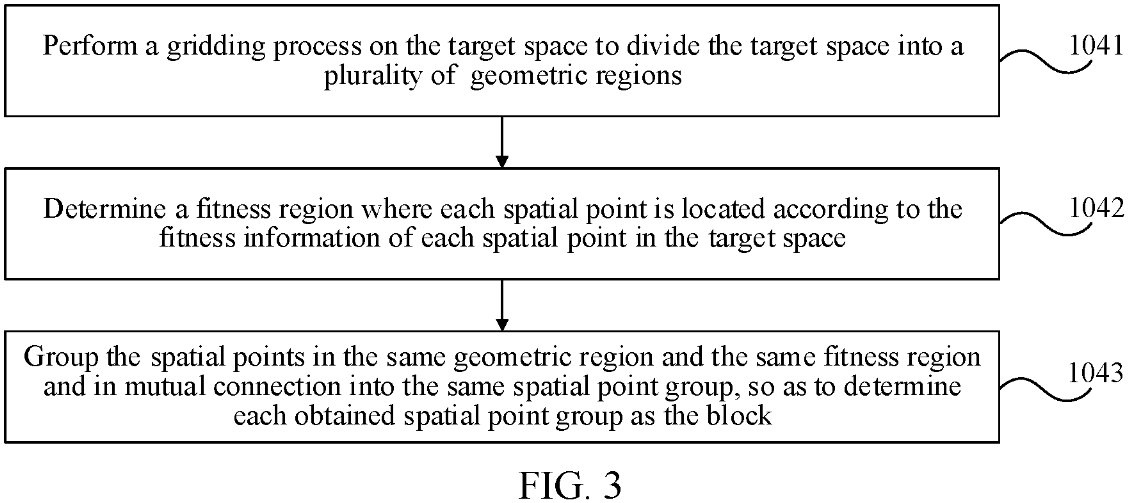
FIG. 3 is a flowchart of a block determining method according to an exemplary embodiment.

FIG. 3 is a flowchart of a block determining method according to an exemplary embodiment. As shown in FIG. 3, step 104 in the method shown in FIG. 2 may further include steps 1041, 1042, and 1043.

At step 1041: a gridding process is performed on the target space to divide the target space into a plurality of geometric regions.

At step 1042: a fitness region where each spatial point is located is determined according to the fitness information of each spatial point in the target space.

Exemplarily, the fitness region includes a dense region and a sparse region. For example, step 1042 may include: determining, in a case that a frequency that the aircraft passes through a first spatial point within the preset time period is greater than a preset frequency, that the first spatial point is in the dense region, where the first spatial point is any one of the plurality of spatial points; or, determining, in a case that the frequency that the aircraft passes through the first spatial point within the preset time period is less than or equal to the preset frequency, that the first spatial point is in the sparse region.

Exemplarily, in this embodiment, the fitness regions where the plurality of spatial points are located are determined by a machine according to the foregoing frequencies and frequency threshold. In another embodiment, the dense region and the sparse region may be fitness regions of the spatial point manually calibrated by a worker after analysis according to environmental information of the spatial point. For example, the environmental information may include whether there are gas stations below the spatial point, whether a network signal at the spatial point is stable, whether weather at the spatial point is suitable for flight, etc. After the fitness region of the spatial point is manually calibrated, step 1042 may be omitted, and a manually output fitness region result is directly received for subsequent steps.

At step 1043: the spatial points in the same geometric region and the same fitness region and in mutual connection are grouped into the same spatial point group, so as to determine the obtained spatial point group as the block.

Exemplarily, as described above, the fitness region is a region determined by performing binary classification on the plurality of spatial points. The spatial points in the dense region are relatively concentrated and in relatively clear connection, and thus may be divided directly according to the grouping operation in step 1043. However, the spatial points in the sparse region are scattered and irregular, and the connections therebetween are relatively difficult to determine, so multiple preset standard points are needed to group the spatial points in the sparse region. The standard point may be a spatial point selected from the plurality of spatial points in the target space. These standard points are in relatively uniform distribution in the target space as well as mutual correlation. Unlike the connections recorded in the first connection information and the second connection information, the correlation is only used for the process of grouping the spatial points in the sparse region. For the standard points in the sparse region, step 1043 may include: dividing the standard points in the same geometric region and the sparse region and in correlation into a same spatial point group, so as to determine each obtained spatial point group as a block.

Exemplarily, in reality, aircrafts rarely fly to positions of the standard points in the sparse region unless the flight origin or the flight destination is in the sparse region. Therefore, in an embodiment, the spatial point groups or blocks formed by the standard points in the sparse region may be ignored during execution of steps 104 and 105 and sub-steps thereof.

Figure 4:
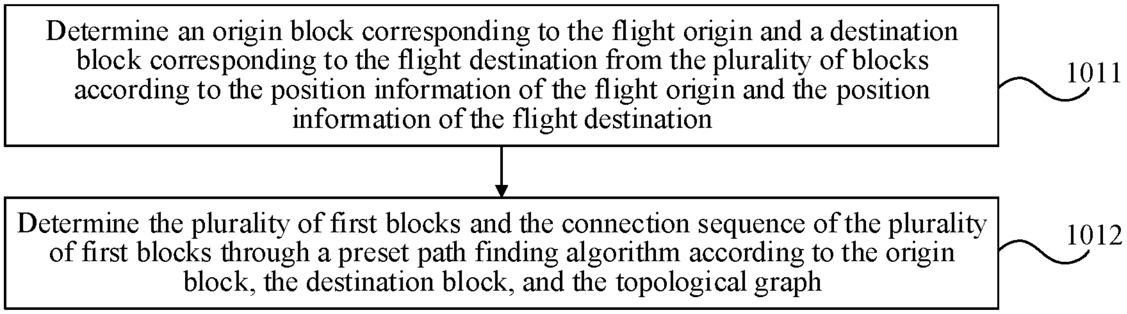
FIG. 4 is a flowchart of a block path determining method according to an exemplary embodiment.

FIG. 4 is a flowchart of a block path determining method according to an exemplary embodiment. As shown in FIG. 4, step 101 in the method shown in FIGS. 1 and 2 may further include steps 1011 and 1012.

At step 1011: an origin block corresponding to the flight origin and a destination block corresponding to the flight destination from the plurality of blocks are determined according to the position information of the flight origin and the position information of the flight destination.

Exemplarily, the origin block corresponding to the flight origin and the destination block corresponding to the flight destination in step 1011 are different according to different inclusion relations between each of the flight origin and the flight destination and a plurality of blocks. Descriptions are made taking the flight origin as an example. If the flight origin is in any block, the origin block is the block where the flight origin is located. If the flight origin is outside any block, the origin block is a block in the same geometric region as the flight origin and closest to the flight origin. Specifically, if it is determined according to the position information of the flight origin that the flight origin is not in any block, it is necessary to first determine the geometric region where the flight origin is located (the geometric region is a geometric region obtained in step 1041). Since these geometric regions satisfy a grid property, center points of all the geometric regions may be put in a tree structure of one geometric region (hereinafter referred to as a region tree structure). The meaning of the region tree structure is completely different from a spatial point tree structure corresponding to each block. However, the region tree structure may also be a k-dimensional tree (referred to as a k-d tree for short) or any ordered tree capable of storing three-dimensional or two-dimensional spatial points. An identifier of each geometric region and position information of the center points of the geometric regions are stored in nodes in the region tree structure. The center point of the geometric region is not necessarily the spatial point defined in this embodiment. A distance between the flight origin and the center point of each geometric region may be calculated, and then the geometric region closest to the flight origin is determined as a target geometric region. After the target geometric region where the flight origin is located is determined, the target geometric region may be searched for a block closest to the flight origin as the origin block. It can be understood that a manner for determining the destination block corresponding to the flight destination is the same as that for determining the origin block corresponding to the flight origin, and will not be elaborated herein.

Exemplarily, in this embodiment, a distance between a spatial point (including the flight origin, the flight destination, and any other spatial point) and a certain block actually represents a distance between the spatial point and a preset position in the block. The preset position may be a position of a center point of a space enclosed by all the spatial points in the block, and the center point is not necessarily the spatial point defined in this embodiment. Alternatively, the preset position may be a position of a certain spatial point in all the spatial points in the block.

At step 1012: the plurality of first blocks and the connection sequence of the plurality of first blocks, i.e., the block path, are determined, through a preset path finding algorithm according to the origin block, the destination block, and the topological graph, where the plurality of first blocks include the origin block and the destination block.

Figure 5:
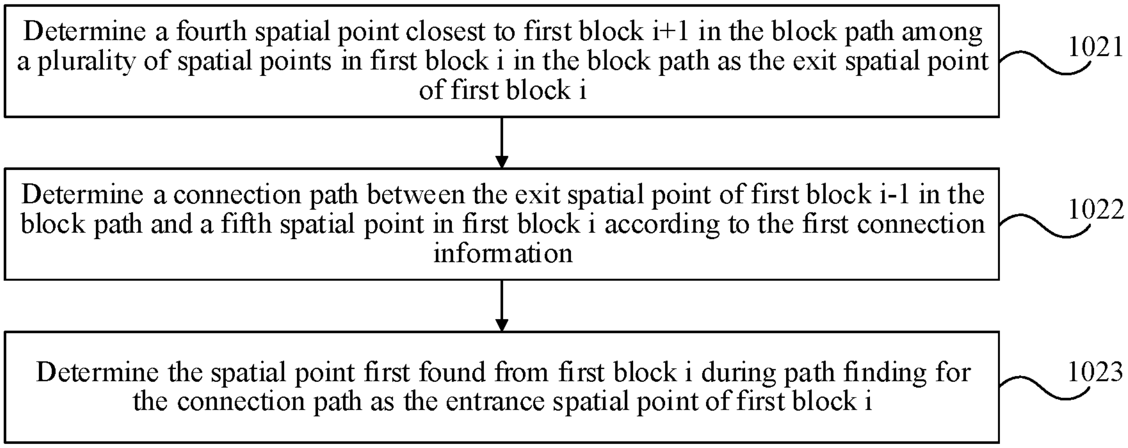
FIG. 5 is a flowchart of an entrance and exit information determining method according to an exemplary embodiment.

FIG. 5 is a flowchart of a method for determining entrance and exit information of a first block according to an exemplary embodiment. For first block i (i is an integer greater than or equal to 1 and less than or equal to the number of the first blocks in the block path) in the block path, as shown in FIG. 5, step 102 in the method shown in FIGS. 1 and 2 may further include steps 1021, 1022, and 1023.

At step 1021: a fourth spatial point closest to first block i+1 in the block path among a plurality of spatial points in first block i is determined as the exit spatial point of first block i.

Exemplarily, in the process of determining the exit spatial point, since the connection sequence of the first blocks in the block path is known, step 1021 may be performed directly from first block (i.e., the origin block) to the last first block (i.e., the destination block) according to the connection sequence, so as to determine the exit spatial point of each first block.

At step 1022: a connection path between the exit spatial point of first block i−1 in the block path and a fifth spatial point in first block i is determined according to a connection between every two spatial points represented by the first connection information, where the fifth spatial point is a spatial point closest to the exit spatial point of first block i−1 in the plurality of spatial points in first block i.

At step 1023: the spatial point first found from first block i during path finding for the connection path is determined as the entrance spatial point of first block i, where a distance between each spatial point and the first block is a distance between the spatial point and a preset position in the first block.

Exemplarily, the process of determining the entrance spatial point of a first block may involve spatial points not in the first block. Specifically, the connection path in steps 1022 and 1023 is from first block i−1 to first block i. Therefore, the connection path may extend into first block i from the exit spatial point of first block i−1 through one or more spatial points not in first block i−1. The point the connection path first passes through in first block i is not necessarily the foregoing fifth spatial point. Therefore, it is necessary to determine the entrance spatial point of first block i. The entrance spatial point of first block i may be the spatial point first found from first block i during path finding for the connection path. Specifically, the connection path is a connection path obtained by searching from the exit spatial point of first block i−1 to the fifth spatial point. During searching, the connection path needs to extend from the outside of first block i to the inside of first block i, so as to reach the fifth spatial point. The spatial point first found from first block i in this searching process is the entrance spatial point of first block i.

Exemplarily, it is less likely in actual execution that both the flight origin and the flight destination are in the first block. Therefore, steps 1021 and 1023 describe a manner for determining the entrance and exit information in a case that both the flight origin and the flight destination are not in any first block. When any one of the flight origin and the flight destination is in a certain first block, the first block where the flight origin is located is directly determined as the origin block in the block path, and the flight origin is determined as the entrance spatial point of the origin block; and/or, the first block where the flight destination is located is determined as the destination block in the block path, and the flight destination is determined as the exit spatial point of the destination block.

Figure 6:
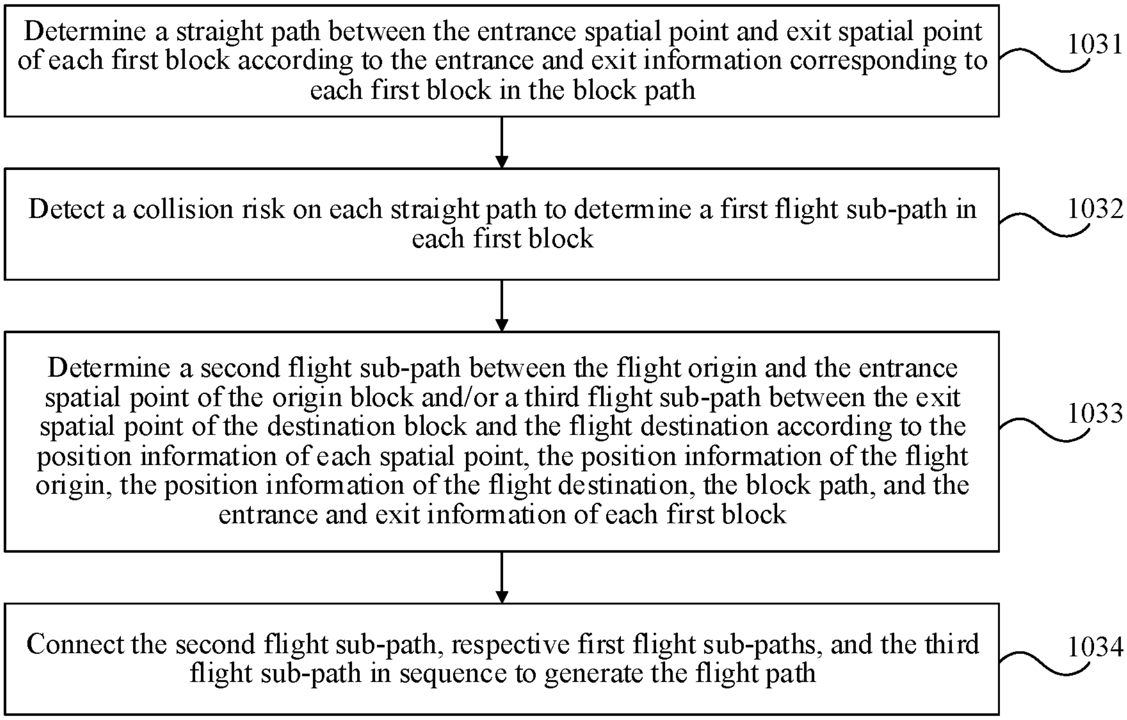
FIG. 6 is a flowchart of a block-path-based flight path determining method based on a block path according to an exemplary embodiment.

FIG. 6 is a flowchart of a block-path-based flight path determining method based on a block path according to an exemplary embodiment. As shown in FIG. 6, step 103 in the method shown in FIGS. 1 and 2 may further include steps 1031, 1032, 1033, and 1034.

At step 1031: a straight path between the entrance spatial point and exit spatial point of each first block is determined according to the entrance and exit information corresponding to each first block in the block path.

At step 1032: a collision risk on the straight path in each first block is detected to determine a first flight sub-path in each first block.

Exemplarily, the straight path is determined as the first flight sub-path in a case that there is no collision risk on the straight path. Alternatively, the first flight sub-path is determined through a preset path planning algorithm according to connections of the spatial points in the first block in a case that there is the collision risk on the straight path.

At step 1033: a second flight sub-path between the flight origin and the entrance spatial point of the origin block and/or a third flight sub-path between the exit spatial point of the destination block and the flight destination is determined according to the position information of each spatial point, the position information of the flight origin, the position information of the flight destination, the block path, and the entrance and exit information of each first block in the block path.

Exemplarily, step 1031 and the following 1034 also describe a manner for determining a flight sub-path in a case that both the flight origin and the flight destination are not in any first block. Specifically, when the flight origin is in the origin block in the plurality of first blocks, and the flight destination is in the destination block in the plurality of first blocks, the flight origin is directly determined as the entrance spatial point of the origin block, and the flight destination is determined as the exit spatial point of the destination block. In other words, the plurality of first flight sub-paths may be determined by steps 1031 to 1032 without 1033 when both the flight origin and the flight destination are in a certain first block in the block path. Then, the plurality of first flight sub-paths are joined in step 1034 according to connection sequence information of the block path. However, when any one of the flight origin and the flight destination is not in any first block, it is necessary to determine the second flight sub-paths and/or the third flight sub-paths, and these sub-paths are considered in the following step 1034.

Exemplarily, there is another condition that neither the flight origin nor the flight destination is a spatial point. As described above, in this embodiment, spatial points in the target space other than the spatial points in the first blocks involved in the block path are regarded as being absent during flight path determining. Therefore, in this embodiment, the spatial points/spatial point in the target space closest to the flight origin and/or the flight destination may be directly determined as the flight origin and/or the flight destination when it is determined that the flight origin and/or the flight destination are/is not spatial points/a spatial point.

At step 1034: the second flight sub-path, respective first flight sub-paths, and the third flight sub-path are connected in sequence to generate the flight path.

In summary, according to the technical solution provided in this embodiment of the present disclosure, an upper-level path including blocks is determined in the target space including the flight origin and the flight destination, and then paths in each block involved in the upper-level path are detailed, so that calculation for flight path finding may be reduced effectively, and the flight path planning efficiency may further be improved.

Figure 7:
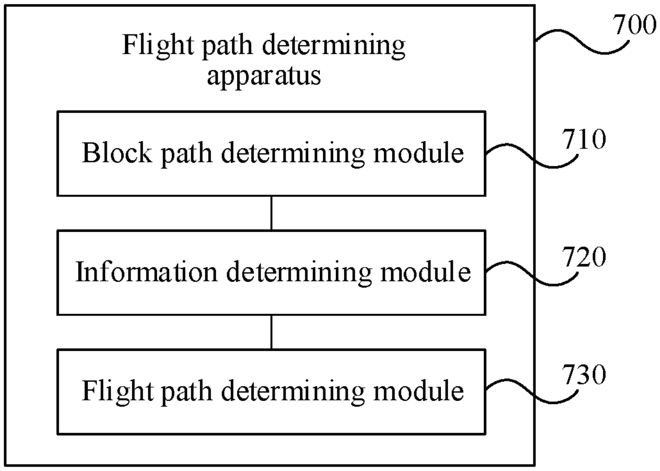
FIG. 7 is a block diagram of a flight path determining apparatus according to an exemplary embodiment.

FIG. 7 is a block diagram of a flight path determining apparatus according to an exemplary embodiment. As shown in FIG. 7, the apparatus 700 includes:

a block path determining module 710, configured to determine, according to position information of a flight origin and position information of a flight destination of a target aircraft, and a topological graph corresponding to a plurality of blocks in a target space, a block path from the plurality of blocks, where the block path is configured to represent a plurality of first blocks that the target aircraft passes through from the flight origin to the flight destination, as well as a connection sequence of the plurality of first blocks, the flight origin and the flight destination are in the target space, there are a plurality of spatial points in the target space, the plurality of spatial points have first connection information, each of the plurality of spatial points has position information, each block includes a spatial point group obtained by grouping the plurality of spatial points, the topological graph is configured to represent connections between the plurality of blocks, and the first connection information is configured to represent whether every two of the plurality of spatial points are in connection;

an information determining module 720, configured to determine entrance and exit information corresponding to each first block according to the position information of each spatial point, the first connection information, and the block path, where the entrance and exit information includes an entrance spatial point of the target aircraft into the first block and/or an exit spatial point of the target aircraft out the first block; and a flight path determining module 730, configured to determine a flight path of the target aircraft from the flight origin to the flight destination according to the position information of each spatial point, the position information of the flight origin, the position information of the flight destination, the block path, and the entrance and exit information corresponding to each first block.

Figure 8:
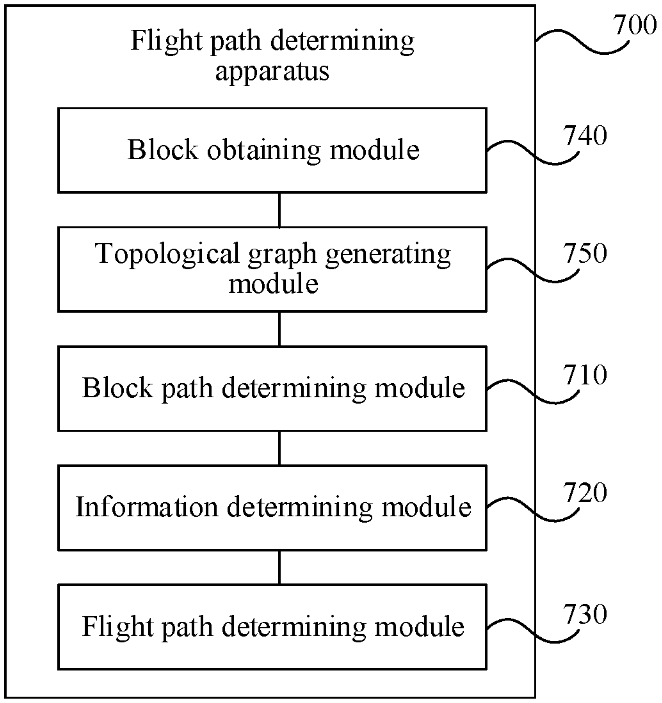
FIG. 8 is a block diagram of a flight path determining apparatus according to another exemplary embodiment.

FIG. 8 is a block diagram of a flight path determining apparatus according to another exemplary embodiment. As shown in FIG. 8, based on the apparatus embodiment shown in FIG. 7, the apparatus 700 further includes:

a block obtaining module 740, configured to group the plurality of spatial points according to the first connection information of the plurality of spatial points in the target space, fitness information of each spatial point, and the position information of each spatial point to determine the plurality of blocks, where each spatial point has the fitness information for representing a frequency that the aircraft passes through the spatial point within a preset time period; and a topological graph generating module 750, configured to determine second connection information corresponding to the plurality of blocks according to the first connection information of the plurality of spatial points to generate the topological graph, where the second connection information is configured to represent whether every two blocks of the plurality of blocks are in connection.

In some embodiments, the block obtaining module 740 is configured to perform a gridding process on the target space to divide the target space into a plurality of geometric regions, determine fitness regions where the plurality of spatial points are located according to the fitness information of each of the spatial points in the target space, and group the spatial points in the same geometric region and the same fitness region and in mutual connection into the same spatial point group, so as to determine each obtained spatial point group as the block.

In some embodiments, the fitness region includes a dense region and a sparse region. The block obtaining module 740 is configured to: determine, in a case that a frequency that the aircraft passes through a first spatial point within the preset time period is greater than a preset frequency, that the first spatial point is in the dense region, where the first spatial point is any one of the plurality of spatial points; or, determine, in a case that the frequency that the aircraft passes through the first spatial point within the preset time period is less than or equal to the preset frequency, that the first spatial point is in the sparse region.

In some embodiments, the topological graph generating module 750 is configured to: determine, in a case that a second spatial point in a second block is in connection with a third spatial point in a third block, that the second block is in connection with the third block to obtain the second connection information, where the second block and the third block are any two of the plurality of blocks, the second spatial point is any spatial point in the second block, and the third spatial point is any spatial point in the third block; and generate the topological graph according to the second connection information.

In some embodiments, the block path determining module 710 is configured to determine an origin block corresponding to the flight origin and a destination block corresponding to the flight destination from the plurality of blocks according to the position information of the flight origin and the position information of the flight destination, and determine the plurality of first blocks and the connection sequence, i.e., the block path, through a preset path finding algorithm according to the origin block, the destination block, and the topological graph, where the plurality of first blocks include the origin block and the destination block.

In some embodiments, for first block i (i is an integer greater than or equal to 1 and less than or equal to the number of the first blocks in the block path) in the block path, the information determining module 720 is configured to: determine a fourth spatial point closest to first block i+1 in the block path among a plurality of spatial points in first block i as the exit spatial point of first block i; determine a connection path between the exit spatial point of first block i−1 in the block path and a fifth spatial point in first block i according to a connection between every two spatial points represented by the first connection information, where the fifth spatial point is a spatial point closest to the exit spatial point of first block i−1 among the plurality of spatial points in first block i; and perform path finding on the connection path, and determine the spatial point first found from first block i during path finding as the entrance spatial point of first block i, where a distance between each spatial point and the first block is a distance between the spatial point and a preset position in the first block.

In some embodiments, the flight path determining module 730 is configured to determine a straight path between the entrance spatial point and exit spatial point of each first block according to the entrance and exit information of each first block in the block path, detect a collision risk on the straight path in each first block to determine a first flight sub-path in each first block, determine a second flight sub-path between the flight origin and the entrance spatial point of the origin block and/or a third flight sub-path between the exit spatial point of the destination block and the flight destination according to the position information of each spatial point, the position information of the flight origin, the position information of the flight destination, the block path, and the entrance and exit information of each first block in the block path, and connect the second flight sub-path, respective first flight sub-paths, and the third flight sub-path in sequence to generate the flight path.

In some embodiments, the flight path determining module 730 is configured to determine the straight path as the first flight sub-path in a case that there is no collision risk on the straight path, or, determine the first flight sub-path through a preset path planning algorithm according to connections of the spatial points in the first block in a case that there is the collision risk on the straight path.

In summary, according to the technical solution provided in this embodiment of the present disclosure, an upper-level path including blocks is determined in the target space including the flight origin and the flight destination, and then paths in each block involved in the upper-level path are detailed, so that calculation for flight path finding may be reduced effectively, and the flight path planning efficiency may further be improved.

Figure 9:
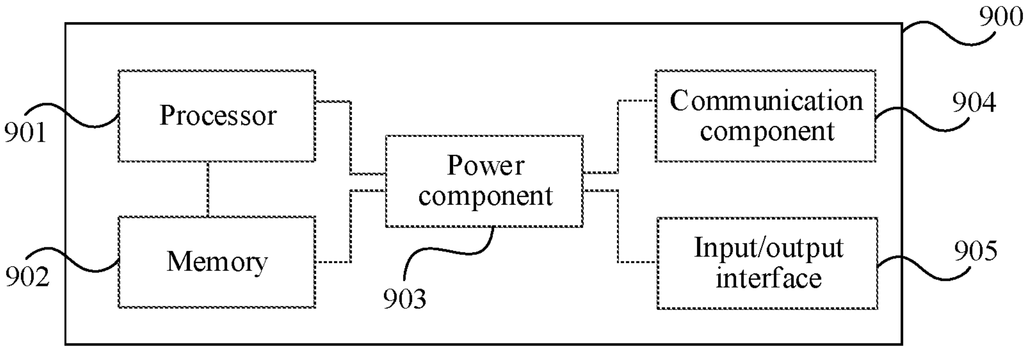
FIG. 9 is a schematic structural diagram of an electronic device according to an exemplary embodiment.

Illustratively, FIG. 9 is a functional block diagram of an electronic device 900 according to an exemplary embodiment. Referring to FIG. 9, an electronic device 900 includes: the number of processors 901 may be one or more. Memory 902 for storing a computer program executable by processor 901. Computer programs stored in memory 902 may include, among other things, one or more modules each corresponding to a set of program instructions. Further, the processor 901 may be configured to execute the computer program to perform the method of determining a flight path described above.

In addition, the electronic device 900 can also include a power component 903 and a communication component 904. Among other things, the power component 903 can be configured to perform power management of the electronic device 900, and the communication component 904 can be configured to enable communication, e.g., wired or wireless communication, of the electronic device 900. In addition, the electronic device 900 may also include an input/output (I/O) interface 905. The electronic device 900 may operate based on an operating system stored in the memory 902, such as Windows Server™, mac OS X™, Unix™, Linux™, etc.

In another exemplary embodiment, there is also provided a computer readable storage medium including program instructions which, when executed by a processor, carry out the steps of the method of determining a flight path described above. For example, the computer readable storage medium can be the memory 902 including program instructions executable by the processor 901 of the electronic device 900 to perform the method of determining a flight path described above.

Some embodiments of the present disclosure have been described in detail above with reference to the accompanying drawings, but the present disclosure is not limited to the specific details in the above embodiments. The technical solutions of the present disclosure can be subject to various simple modifications within the scope of the technical concept of the present disclosure, all falling within the scope of the present disclosure.

In addition, it should be noted that each of the specific technical features described in the above-mentioned embodiments can be combined in any suitable manner without contradiction, and in order to avoid unnecessary repetition, the present disclosure will not describe any possible combination.

The invention claimed is:

1. A flight path determining method implemented electronically by a processor, the method comprising:
 determining, according to position information of a flight origin of a target aircraft, position information of a flight destination of the target aircraft, and a topological graph corresponding to a plurality of blocks in a target space, a block path from the plurality of blocks, wherein
  the block path is configured to represent a plurality of first blocks that the target aircraft passes through from the flight origin to the flight destination,
  both the flight origin and the flight destination are in the target space,
  a plurality of spatial points with first connection information are in the target space, and the first connection information is configured to represent whether every two spatial points in the target space are in connection, and
 the block comprises a spatial point group determined by grouping the plurality of spatial points;
 determining entrance and exit information corresponding to each of the plurality of first blocks according to position information of each spatial point, the first connection information, and the block path, wherein the entrance and exit information of the first block comprises:
  an entrance spatial point of the target aircraft into the first block, and/or
  an exit spatial point of the target aircraft out the first block;
 determining a flight path of the target aircraft from the flight origin to the flight destination according to the block path and the entrance and exit information corresponding to each of the plurality of first blocks;
 grouping the plurality of spatial points according to the first connection information and fitness information and position information of each spatial point to determine the plurality of blocks, wherein the fitness information of the spatial point is configured to represent a frequency that an aircraft passes through the spatial point within a preset time period, and spatial points in each block of the plurality of blocks are stored in a tree structure;
 determining second connection information corresponding to the plurality of blocks according to the first connection information to generate the topological graph, wherein the second connection information is configured to represent whether every two blocks of the plurality of blocks are in connection;
 in response to determining that fitness information of the spatial point is greater than a preset frequency, grouping the spatial point in a dense region;
 in response to determining that fitness information of the spatial point is less than or equal to the preset frequency, grouping the spatial point in a sparse region;
 ignoring spatial point groups in the sparse region; and
 autonomously piloting the target aircraft from the flight origin to the flight destination according to the flight path.

2. The method according to claim 1, wherein grouping the plurality of spatial points according to the first connection information and fitness information and position information of each spatial point to determine the plurality of blocks comprises:
 performing a gridding process on the target space to divide the target space into a plurality of geometric regions;
 for each spatial point, determining a fitness region of the spatial point according to the fitness information of the spatial point; and
 grouping spatial points in a same geometric region and a same fitness region and in mutual connection into a same spatial point group as the block.

3. The method according to claim 2, wherein the fitness region comprises the dense region and the sparse region, and for each spatial point, determining the fitness region of the spatial point according to the fitness information of the spatial point comprises:
 determining, in response to determining that the frequency that an aircraft passes through the spatial point within the preset time period is greater than the preset frequency, that the spatial point is in the dense region; or
 determining, in response to determining that the frequency that an aircraft passes through the spatial point within the preset time period is less than or equal to the preset frequency, that the spatial point is in the sparse region.

4. The method according to claim 1, wherein determining the second connection information corresponding to the plurality of blocks according to the first connection information to generate the topological graph comprises:
 determining, in response to determining that a second spatial point in a second block is in connection with a third spatial point in a third block, that the second block is in connection with the third block to obtain the second connection information, wherein
  the second block and the third block are any two of the plurality of blocks,
  the second spatial point is any spatial point in the second block, and
  the third spatial point is any spatial point in the third block; and
 generating the topological graph according to the second connection information.

5. The method according to claim 1, wherein the block path is further configured to represent a connection sequence of the plurality of first blocks, and the determining, according to position information of the flight origin of the target aircraft and position information of the flight destination of the target aircraft, and the topological graph corresponding to the plurality of blocks in the target space, the block path from the plurality of blocks comprises:
 determining an origin block corresponding to the flight origin and a destination block corresponding to the flight destination from the plurality of blocks according to the position information of the flight origin and the position information of the flight destination; and
 determining the plurality of first blocks and the connection sequence through a preset path finding algorithm according to the origin block, the destination block, and the topological graph, wherein the plurality of first blocks comprise the origin block and the destination block.

6. The method according to claim 1, wherein determining the entrance and exit information corresponding to each of the plurality of first blocks according to position information of each spatial point, the first connection information, and the block path comprises:

determining a fourth spatial point closest to $(i+1)^{th}$ first block in the block path among a plurality of spatial points in $i^{th}$ first block in the block path as an exit spatial point of the $i^{th}$ first block;

determining a connection path between the exit spatial point of $(i-1)^{th}$ first block in the block path and a fifth spatial point in $i^{th}$ first block according to the first connection information, wherein the fifth spatial point is a spatial point closest to an exit spatial point of $(i-1)^{th}$ first block among the plurality of spatial points in $i^{th}$ first block; and determining a spatial point first found from first block i during path finding for the connection path as an entrance spatial point of $i^{th}$ first block; and, wherein i is an integer greater than or equal to 1, and a distance between a spatial point and the first block is a distance between the spatial point and a preset position in the first block.

7. The method according to claim 1, wherein determining the flight path of the target aircraft from the flight origin to the flight destination according to the block path and the entrance and exit information corresponding to each first block comprises:

for each first block, determining a straight path between an entrance spatial point of the first block and an exit spatial point of the first block according to the entrance and exit information corresponding to the first block;

detecting a collision risk on each straight path to determine a first flight sub-path in each first block;

determining a second flight sub-path between the flight origin and the entrance spatial point of the first block corresponding to the flight origin in the block path, and a third flight sub-path between the exit spatial point of the first block corresponding to the flight destination in the block path and the flight destination, according to the position information of each spatial point, the position information of the flight origin, the position information of the flight destination, the block path, and the entrance and exit information corresponding to each first block; and connecting the second flight sub-path, respective first flight sub-paths, and the third flight sub-path in sequence to generate the flight path.

8. The method according to claim 7, wherein the detecting the collision risk on each straight path to determine the first flight sub-path in each first block comprises:

determining the straight path as the first flight sub-path in a case that there is no collision risk on the straight path; or, determining the first flight sub-path through a preset path planning algorithm according to connections of spatial points in the first block in a case that there is the collision risk on the straight path.

9. A non-transitory computer readable storage medium having a computer program stored thereon, when the computer program is executed by a processor, causing the processor to implement operations comprising:

a memory having a computer program stored thereon;

a processor for executing the computer program in the memory to implement operations comprising:

determining, according to position information of a flight origin of a target aircraft, position information of a flight destination of the target aircraft, and a topological graph corresponding to a plurality of blocks in a target space, a block path from the plurality of blocks, wherein the block path is configured to represent a plurality of first blocks that the target aircraft passes through from the flight origin to the flight destination, both the flight origin and the flight destination are in the target space, a plurality of spatial points with first connection information are in the target space, and the first connection information is configured to represent whether every two spatial points in the target space are in connection, and the block comprises a spatial point group determined by grouping the plurality of spatial points;

determining entrance and exit information corresponding to each of the plurality of first blocks according to position information of each spatial point, the first connection information, and the block path, wherein the entrance and exit information of the first block comprises:

an entrance spatial point of the target aircraft into the first block, and/or an exit spatial point of the target aircraft out the first block;

determining a flight path of the target aircraft from the flight origin to the flight destination according to the block path and the entrance and exit information corresponding to each of the plurality of first blocks;

grouping the plurality of spatial points according to the first connection information and fitness information and position information of each spatial point to determine the plurality of blocks, wherein the fitness information of the spatial point is configured to represent a frequency that an aircraft passes through the spatial point within a preset time period, and spatial points in each block of the plurality of blocks are stored in a tree structure;

determining second connection information corresponding to the plurality of blocks according to the first connection information to generate the topological graph, wherein the second connection information is configured to represent whether every two blocks of the plurality of blocks are in connection;

in response to determining that fitness information of the spatial point is greater than a preset frequency, grouping the spatial point in a dense region;

in response to determining that fitness information of the spatial point is less than or equal to the preset frequency, grouping the spatial point in a sparse region;

ignoring spatial point groups in the sparse region; and autonomously piloting the target aircraft from the flight origin to the flight destination according to the flight path.

10. An electronic device comprising:

a memory having a computer program stored thereon;

a processor for executing the computer program in the memory to implement operations comprising:

determining, according to position information of a flight origin of a target aircraft, position information of a flight destination of the target aircraft, and a topological graph corresponding to a plurality of blocks in a target space, a block path from the plurality of blocks, wherein the block path is configured to represent a plurality of first blocks that the target aircraft passes through from the flight origin to the flight destination, both the flight origin and the flight destination are in the target space, a plurality of spatial points with first connection information are in the target space, and the first connection information is configured to represent whether every two spatial points in the target space are in connection, and the block comprises a spatial point group determined by grouping the plurality of spatial points;

determining entrance and exit information corresponding to each of the plurality of first blocks according to position information of each spatial point, the first connection information, and the block path, wherein the entrance and exit information of the first block comprises:

an entrance spatial point of the target aircraft into the first block, and/or an exit spatial point of the target aircraft out the first block;

determining a flight path of the target aircraft from the flight origin to the flight destination according to the block path and the entrance and exit information corresponding to each of the plurality of first blocks;

grouping the plurality of spatial points according to the first connection information and fitness information and position information of each spatial point to determine the plurality of blocks, wherein the fitness information of the spatial point is configured to represent a frequency that an aircraft passes through the spatial point within a preset time period, and spatial points in each block of the plurality of blocks are stored in a tree structure;

determining second connection information corresponding to the plurality of blocks according to the first connection information to generate the topological graph, wherein the second connection information is configured to represent whether every two blocks of the plurality of blocks are in connection;

in response to determining that fitness information of the spatial point is greater than a preset frequency, grouping the spatial point in a dense region;

in response to determining that fitness information of the spatial point is less than or equal to the preset frequency, grouping the spatial point in a sparse region;

ignoring spatial point groups in the sparse region; and autonomously piloting the target aircraft from the flight origin to the flight destination according to the flight path.

11. The electronic device according to claim 10, wherein grouping the plurality of spatial points according to the first connection information and fitness information and position information of each spatial point to determine the plurality of blocks comprises:

performing a gridding process on the target space to divide the target space into a plurality of geometric regions;

for each spatial point, determining a fitness region of the spatial point according to the fitness information of the spatial point; and grouping spatial points in a same geometric region and a same fitness region and in mutual connection into a same spatial point group as the block.

12. The electronic device according to claim 11, wherein the fitness region comprises the dense region and the sparse region, and for each spatial point, determining the fitness region of the spatial point according to the fitness information of the spatial point comprises:

determining, in response to determining that the frequency that an aircraft passes through the spatial point within the preset time period is greater than the preset frequency, that the spatial point is in the dense region; or, determining, in response to determining that the frequency that an aircraft passes through the spatial point within the preset time period is less than or equal to the preset frequency, that the spatial point is in the sparse region.

13. The electronic device according to claim 10, wherein determining the second connection information corresponding to the plurality of blocks according to the first connection information to generate the topological graph comprises:

determining, in response to determining that a second spatial point in a second block is in connection with a third spatial point in a third block, that the second block is in connection with the third block to obtain the second connection information, wherein the second block and the third block are any two of the plurality of blocks, the second spatial point is any spatial point in the second block, and the third spatial point is any spatial point in the third block; and generating the topological graph according to the second connection information.

14. The electronic device according to claim 10, wherein the block path is further configured to represent a connection sequence of the plurality of first blocks, and the determining, according to position information of the flight origin of the target aircraft and position information of the flight destination of the target aircraft, and the topological graph corresponding to the plurality of blocks in the target space, the block path from the plurality of blocks comprises:

determining an origin block corresponding to the flight origin and a destination block corresponding to the flight destination from the plurality of blocks according to the position information of the flight origin and the position information of the flight destination; and determining the plurality of first blocks and the connection sequence through a preset path finding algorithm according to the origin block, the destination block, and the topological graph, wherein the plurality of first blocks comprise the origin block and the destination block.

15. The electronic device according to claim 10, wherein determining the entrance and exit information corresponding to each of the plurality of first blocks according to position information of each spatial point, the first connection information, and the block path comprises:

determining a fourth spatial point closest to $(i+1)^{th}$ first block in the block path among a plurality of spatial points in $i^{th}$ first block in the block path as an exit spatial point of the $i^{th}$ first block;

determining a connection path between the exit spatial point of $(i-1)^{th}$ first block in the block path and a fifth spatial point in $i^{th}$ first block according to the first connection information, wherein the fifth spatial point is a spatial point closest to an exit spatial point of $(i-1)^{th}$ first block among the plurality of spatial points in $i^{th}$ first block; and determining a spatial point first found from first block i during path finding for the connection path as an entrance spatial point of $i^{th}$ first block; and, wherein i is an integer greater than or equal to 1, and a distance between a spatial point and the first block is a distance between the spatial point and a preset position in the first block.

16. The electronic device according to claim 10, wherein determining the flight path of the target aircraft from the flight origin to the flight destination according to the block path and the entrance and exit information corresponding to each first block comprises:

for each first block, determining a straight path between an entrance spatial point of the first block and an exit spatial point of the first block according to the entrance and exit information corresponding to the first block;

detecting a collision risk on each straight path to determine a first flight sub-path in each first block;

determining a second flight sub-path between the flight origin and the entrance spatial point of the first block corresponding to the flight origin in the block path, and a third flight sub-path between the exit spatial point of the first block corresponding to the flight destination in the block path and the flight destination, according to the position information of each spatial point, the position information of the flight origin, the position information of the flight destination, the block path, and the entrance and exit information corresponding to each first block; and connecting the second flight sub-path, respective first flight sub-paths, and the third flight sub-path in sequence to generate the flight path.

17. The electronic device according to claim 16, wherein the detecting the collision risk on each straight path to determine the first flight sub-path in each first block comprises:

determining the straight path as the first flight sub-path in a case that there is no collision risk on the straight path; or, determining the first flight sub-path through a preset path planning algorithm according to connections of spatial points in the first block in a case that there is the collision risk on the straight path.

* * * * *